United States Patent [19]

Hagens et al.

[11] Patent Number: 5,158,844

[45] Date of Patent: Oct. 27, 1992

[54] BATTERY SEPARATOR

[75] Inventors: Vicky L. Hagens, West Hartford; Richard P. James, Windsor; Vaughan R. Annis, Windsor Locks, all of Conn.

[73] Assignee: The Dexter Corporation, Windsor Locks, Conn.

[21] Appl. No.: 666,385

[22] Filed: Mar. 7, 1991

[51] Int. Cl.$^5$ .............................................. H01M 2/16
[52] U.S. Cl. ............................... 429/249; 429/254; 429/247
[58] Field of Search .................. 429/249, 254, 247

[56] References Cited

U.S. PATENT DOCUMENTS

| 3,121,658 | 2/1964 | Orsino et al. | 162/146 |
|---|---|---|---|
| 3,418,405 | 12/1968 | Kajitani | 264/190 |
| 3,476,602 | 11/1969 | Brown et al. | 136/6 |
| 3,557,962 | 1/1971 | Kohl | 210/321 |
| 3,573,994 | 4/1971 | Field | 136/145 |
| 3,626,045 | 12/1971 | Woodings | 264/54 |
| 3,716,411 | 2/1973 | Ogawa et al. | 136/30 |
| 3,791,868 | 2/1974 | Compton et al. | 136/13 |
| 3,914,501 | 10/1975 | Miller et al. | 428/296 |
| 3,915,750 | 10/1975 | Uetani et al. | 136/131 |
| 4,130,689 | 12/1978 | Costa, Jr. | 428/398 |
| 4,224,386 | 9/1980 | Levine | 429/104 |
| 4,242,411 | 12/1980 | Costa, Jr. et al. | 428/369 |
| 4,279,979 | 7/1981 | Benson et al. | 429/254 |
| 4,286,030 | 8/1981 | Moore | 429/253 |
| 4,734,344 | 3/1988 | Choi | 429/206 |
| 4,746,586 | 5/1988 | Mizutani et al. | 429/145 |
| 4,767,687 | 8/1988 | LaBonte | 429/206 |
| 4,812,145 | 3/1989 | LaBonte | 429/623.1 |

OTHER PUBLICATIONS

Marjory L. Joseph, Introductory Textile Science, Holt, Rinehart & Winston (1986) p. 33.
Inez V. deGruy et al., The Fine Structure of Cotton, Marcel Dekker, Inc. (1973), p. 53.
Milton Harris, Handbook of Textile Fibers, pp. 115–116, Harris Research Lab., Washington (1954).

*Primary Examiner*—Anthony McFarlane
*Assistant Examiner*—Caridad Everhart
*Attorney, Agent, or Firm*—Chilton, Alix & Van Kirk

[57] ABSTRACT

A battery separator in the form of a nonwoven fibrous web of water dispersible fibers incorporates up to 65% by weight of fibers having a high cross-sectional aspect ratio. The high aspect ratio fibers include collapsible hollow fibers and ribbon fibers that have a width five to ten times greater than their thickness. These fibers provide reduced thickness at the same basis weight and a synergistic reduction in shrinkage when combined with lower denier solid fibers.

16 Claims, No Drawings

BATTERY SEPARATOR

BACKGROUND AND SUMMARY OF THE INVENTION

The present invention relates generally to porous, absorbent sheet material and more particularly is concerned with a new and improved electrode separator for electric storage cells employing an alkaline electrolyte.

Separators for isolating the positive and negative electrodes of alkaline cells typically take the form of a porous, relatively stiff, fibrous sheet material capable of withstanding the highly alkaline environment of the electrolyte used in these cells. Some of these separators have been made from predominantly cellulosic fibers, such as viscose rayon fibers, while others have been composed primarily of synthetic fibers, such as poly(vinyl alcohol) or polyolefin fibers. Still others have employed a combination of both cellulosic and synthetic fibers. See for example U.S. Pat. Nos. 3,915,750 and 4,746,586, the disclosures of which are incorporated herein by reference. Although both cellulosic and noncellulosic fibers of the type mentioned are stable in the alkaline electrolyte solutions, each fiber type has its own particular advantages and disadvantages. For example, nonwoven sheet material made of predominantly regenerated cellulosic fibers exhibit the advantageous characteristics of high absorption and low cost. However, they also result in rather thick or bulky webs of high porosity and large pore size. The thickness of these webs limits their use to cells where this bulkiness can be tolerated. Additionally, they usually require a post formation treatment with a binder system such as a viscose binder and exhibit relatively high shrinkage within the plane of the sheet when exposed to the aqueous alkaline electrolyte. The non-cellulosic nonwoven fiber webs, such as those made from poly(vinyl alcohol) fibers, on the other hand exhibit almost no shrinkage in the alkaline electrolyte solution and advantageously use soluble poly(vinyl alcohol) as the binder during sheet formation. The poly(vinyl alcohol) sheet material is, unfortunately, of significantly higher cost and also is very thick, typically requiring calendering, wet pressing or the use of dryer felts to reduce the thickness thereof. It also requires the addition of a surfactant to improve its absorbency characteristics.

As indicated, attempts have been made to combine both cellulosic and synthetic fibers in order to achieve the benefits of both fibrous materials. However, the nonwoven webs using both types of fiber still have several disadvantages, the most prominent of which is the need for secondary processing such as calendering to reduce the thickness of the resultant material. Unfortunately, when the calendered separator material is immersed in the alkaline electrolyte solution, its thickness increases to such an extent, typically about 10% to 50%, that it regains most of its precalendered thickness, thereby creating a problem due to the limited space available within the cell.

It has now been found in accordance with the present invention that a modification in the fiber content of the separator sheet material will provide for the retention of the high absorbency characteristics of the cellulosic fibers, yet at the same time reduce the bulk or thickness of the sheet material and, importantly, reduce the planar shrinkage and size of the pores within the sheet material. This is achieved at substantially the same or lower basis weights without requiring secondary processing such as calendering or the like in order to reduce the thickness of the separator. The elimination of the calendering advantageously has the effect of limiting the thickness regain or swelling of the material in the alkaline electrolyte.

The adjustment in the fiber composition also provides a better means of controlling the pore size of the material while still using the advantageous features of the regenerated cellulosic fibers, namely, its absorbency, stability and cost. The reduced pore size achieved in accordance with the present invention significantly enhances the shelf life of the resultant cell.

The fiber control of the present invention also facilitates a reduction in the basis weight of the web material while maintaining the necessary barrier properties through pore size control and the necessary web strength through enhanced fiber-to-fiber contact. The separator volume within each cell is advantageously reduced thereby allowing increased cell performance.

Other advantages and features of the present invention will be in part obvious and in part pointed out more in detail hereinafter.

These and related features are achieved in accordance with the present invention by providing a new and improved separator of the type described in the form of a nonwoven fibrous web of water dispersible fibers that incorporates up to 100% by weight of fibers having a high cross-sectional aspect ratio, the fibers being uniformly distributed throughout the web material and anchored therein with the help of a suitable synthetic binder. The high cross-sectional aspect fibers include collapsible hollow fibers and ribbon fibers that have a significantly greater width than thickness in the dry fibrous web material. The high cross-sectional aspect fibers also appear to provide a synergistic reduction in shrinkage when combined with lower denier solid fibers of regular cross section.

A better understanding of the objects, advantages and relationships of the invention will be obtained from the following detailed description of separators possessing the features, properties and relation of elements exemplified herein. Included are illustrative embodiments that are indicative of the various ways in which the principles of the invention are employed.

DESCRIPTION OF A PREFERRED EMBODIMENT

Although the new and improved battery separator of the present invention will find application in numerous different types of batteries, for ease of understanding and clarity of description, it will be described in connection with electric cells employing an alkaline electrolyte. The separator is produced in accordance with conventional paper making techniques in order to obtain the desired thin, light weight material of sufficient structural integrity to withstand the stresses encountered in handling the material on automated machinery. Thus, the nonwoven fibrous web material is comprised of water dispersible fibers well suited to paper making operations wherein the fibers are initially dispersed at very low concentrations within large amounts of an aqueous dispersing medium and subsequently deposited on a fiber collecting wire in the form of a thin continuous nonwoven web material.

In accordance with the present invention, the high aspect ratio fibers are preferably used to replace fibers of substantially the same composition, although they also may replace other fibers of different composition within the nonwoven sheet material. Thus if the predominant fiber in a separator sheet is cellulosic, such as viscose rayon, it is generally preferred and most likely that the high aspect fiber also will be cellulosic. Similarly, if the primary fiber within the separator is a synthetic material, a synthetic high aspect fiber may be employed, although in many instances it is preferred to employ a high aspect fiber of a different material so as to obtain the benefits of the particular fiber mix. It will, of course, be appreciated that even those sheet materials that are categorized as predominantly cellulosic or predominantly non-cellulosic will incorporate other secondary fibers in order to modify the processing of the sheet material or the physical characteristics thereof. Thus, a separator sheet referred to as a rayon sheet might in fact include minor amounts of natural cellulosic fibers of various types. For example, extra long natural fibers such as hemp fibers might be incorporated into a sheet together with small amounts of fibrillated extremely short particles, such as papermakers' binding flock of the type described in U.S. Pat. No. 2,477,000.

The regenerated cellulosic fiber sheet material employed heretofore as separators have frequently included thermoplastic binder fibers, such as the so-called Vinyon fibers made of a copolymer of vinyl acetate and vinyl chloride. In this connection, reference may be made to U.S. Pat. No. 2,414,833 for a fuller description thereof. However, in the battery separator sheet material, the thermoplastic binder fiber typically is dispersed uniformly throughout the sheet material and is not employed as a separate phase or layer.

For separators made from synthetic fibers, such as poly(vinyl alcohol) fibers, the nondissolvable poly(vinyl alcohol) fibers are admixed with dissolvable or fusable poly(vinyl alcohol) binder fibers so as to dissolve, partially dissolve or fuse the fibers during drying of the web. The dissolved poly(vinyl alcohol) in the wet web permeates in and around the nondissolvable fibers and forms a matrix around the nondissolvable fibers which, upon drying, fully bonds the sheet material. As will be appreciated, a mixture of synthetic and cellulosic fibers may be used in place of the nondissolvable poly(vinyl alcohol) fibers in order to provide a separator having the desirable characteristics of the mixed fiber composition.

In accordance with the present invention, it has unexpectedly been found that a significant reduction in the thickness of the nonwoven web material can be achieved together with an improvement in strength and a reduction in shrinkage by introducing into the nonwoven web material a significant portion of fibers having a high cross-sectional aspect ratio. In this connection, it has been found that at least 5% of the high aspect fibers should be employed in order to have a meaningful effect on the properties of the separator. Up to 95-100% of such fibers can efficaciously be incorporated although the preferred amount of high aspect fiber is generally less than one half the total fiber content of the sheet material. Good results have been achieved within the range of about 5% to 60% with the preferred range being about 10% to 45%. The amount of high aspect fibers used will depend on the desired degree of thickness reduction and porosity control.

The fibers exhibiting a high cross-sectional aspect ratio generally fall into the two categories of ribbon fibers and collapsible hollow fibers. However, other fibers having a substantially greater width than thickness are likely to provide the improved results noted herein. The cross-sectional aspect ratio generally falls within a range extending from 2 to 20 with the preferred ratio being in the range of about 5 to 10. Those fibers which have an aspect ratio lower than 2 tend to act in a manner substantially similar to conventional fibers whereas those having an aspect ratio greater than 20 ar unwieldy and difficult to handle within the wet papermaking process.

It will be appreciated that collapsible hollow fibers are preferred since these fibers tend to maintain their hollow cross-sectional configuration within the fiber slurry of the papermaking operation and facilitate uniform dispersion through the entire sheet material. However, the hollow fibers must exhibit a tendency to collapse or flatten during drying of the nonwoven web to provide the desired high cross-sectional aspect character. As can be appreciated, collapsible hollow fibers typically have a much thinner wall structure than noncollapsible hollow fibers that tend to maintain their cylindrical form due to the rigidity of the material. The collapsible hollow fibers in their flattened condition also tend to provide a beneficially high interfiber surface contact area for improved integrity in the web structure and significantly lower porosity and pore size, coupled with the advantageous reduction in the thickness of the separator sheet material even at comparable basis weights.

For the alkaline battery separators, it is essential that the hollow or high aspect fibers be well suited to the highly alkaline environment of the electric cell. Thus, fibers made of polyester material that may lack long term stability or glass that may result in contamination of the cell are not recommended. On the other hand, polyolefins or polyamides as well as poly(vinyl alcohol) and rayon fibers clearly provide the best results. From among these, the rayon fibers are preferred due to the ready supply thereof and their relative lower cost when compared with the other synthetic fibers. The fibers employed have a denier up to about 20 dpf (denier per filament with the ribbon fibers typically being at the higher end of that range. The preferred hollow fibers have a denier in the range of about 0.5 to 15 dpf with the lower denier material of 1 to 3 dpf providing excellent results.

The fiber length may also vary significantly within the range of about 2-30 millimeters with the preferred material falling near the lower end of the range extending from 3 to 15 millimeters. Hollow rayon fibers found suitable for this purpose include the rayon fibers manufactured by Diawa Spinning Co. and sold under the designation "Type SBH" hollow rayon. Rayon fibers in ribbon form are also obtainable from the same supplier under the designation "Type SBR".

As mentioned, the binder used in the separators may include soluble poly(vinyl alcohol) fibers, particularly when using insoluble poly(vinyl alcohol) fibers as a primary fiber component. In addition, solutions of poly(vinyl alcohol) may be used as a post formation application to the preformed fibrous web. The expression "solution of poly(vinyl alcohol)" as used herein is intended to cover solutions of vinyl polymers where the poly(vinyl alcohol) moiety constitutes about 50% to 100% of the vinyl polymer present in the solution. Since poly(vinyl alcohol) is normally prepared by hydrolysis of polyvinyl esters such as poly(vinyl acetate), the degree of substitution will vary and the hydroxyl content may vary substantially. Accordingly, for the purpose of the present invention, it is generally preferred that the material exhibits the requisite bonding strength. This may be achieved at poly(vinyl alcohol) levels of 50% and more but preferably at levels where the polymer is predominantly poly(vinyl alcohol), that is, where poly(vinyl alcohol) levels are at least about 80% or greater. Although various commercial products are available, it has been found that excellent results are obtained when using a fully hydrolized (98-99% hydrolysis) aqueous poly(vinyl alcohol) solution such as the material sold by Air Products Co. under the trademark "Airvol 107".

The concentration of the poly(vinyl alcohol) in the aqueous solution may vary substantially depending on not only the fiber composition of the base web material but also the type of bonding treatment employed and the machine conditions encountered during the treating operation. The concentration of the poly(vinyl alcohol) within its aqueous dispersing medium is usually less than 15% by weight and typically falls within the range of from about 1% to 10% by weight. In this connection excellent results have been achieved using a poly(vinyl alcohol) concentration within the range of 3% to 8% by weight. The binder pick up in the nonwoven web material will be up to 30% based on the dry fiber within the web. Generally, a binder content of 3-20% is employed with excellent results being achieved at binder pick up levels of 5-10%.

Generally, it is advantageous to add small amounts of a surfactant particularly where synthetic fibers are employed. Where post formation bonding is not employed, such as with poly(vinyl alcohol) sheet formation, the surfactant is added to the fiber furnish. In that instance, cationic surfactants such as the alkyl polyhydroxy-substitued ammonium salts may be used with good success. The nonionic polyglycols or alkylaryl polyether alcohols are effective as post formation treatments. Examples of these include block copolymers of ethylene oxide and propylene oxide sold by BASF under the trademark "Pluronic L-64" and the octylphenoxy polyethoxy ethanol sold by Rohm and Hass under the trademark "Triton X114". Other surfactants of the same or different chemical type also may be effectively used. The surfactants are used in the dilute binder solution in concentrations well below 2% by weight and, in fact, at concentrations below 1.0% so as to avoid loss of wet strength in the bonded substrate. Typically, concentrations of about 0.1 to 0.8% by weight are used. The pick up of the surfactant in the web material is generally less than 1% and typically falls within the range of 0.3-0.5% on a dry fiber weight basis.

Having generally described the invention, the following examples are included for purposes of illustration so that the invention may be more readily understood and are in no way intended to limit the scope of the invention unless otherwise specifically indicated. All amounts are on a weight basis unless otherwise specified.

EXAMPLE 1

Nonwoven sheet material was formed on a paper making machine using a fiber furnish consisting of 56% insoluble poly(vinyl alcohol) fiber having a denier of 0.5 dpf., 16% soluble poly(vinyl alcohol) fiber having a denier of 1.1 dpf., and 28% hollow viscose rayon fiber having a denier of 1.5 dpf and a length of 5 millimeters. The properties of the resultant sheet material are shown in Table 1 as Example 1-A.

A second nonwoven sheet material was prepared using the identical material except that the amount of hollow fiber was increased to 42% and the amount of insoluble poly(vinyl alcohol) fiber was decreased to 42%. The properties of the sheet material resulting therefrom is set forth in Table I as Example 1-B.

A control sheet material was also prepared on a paper making machine using a formulation similar to Example 1-A except that standard solid viscose rayon fibers were used in place of the hollow fibers. The regular viscose rayon fibers also had a denier of 1.5 dpf and a length of 5 millimeters. In the control sheet material, the denier of the insoluble poly(vinyl alcohol) was the same as the soluble poly(vinyl alcohol) binder fibers, namely 1.1 dpf. The control material was then hot calendered to reduce the thickness of the material to about 7 mils. The properties of the calendered control material are also set forth in Table I.

EXAMPLE 2

Hand sheets having a basis weight of 55 g/m² were prepared using the fiber furnishes set forth in Table II so as to compare various modifications of the fiber furnishes. It should be noted that none of the hand sheets were subject to secondary treatment such as calendering so as to provide a more meaningful comparison between the various fiber furnishes.

TABLE I

|  | Control | 1-A | 1-B |
| --- | --- | --- | --- |
| COMPOSITION (%): |  |  |  |
| PVOH 1.1 dpf × 3 mm | 56 | — | — |
| PVOH 0.5 dpf × 3 mm | — | 56 | 42 |
| PVOH 1.1 dpf × 3 mm binder | 16 | 16 | 16 |
| Rayon 5 mm × 1.5 dpf Regular | 28 | — | — |
| Rayon 5 mm × 1.5 dpf Hollow | — | 28 | 42 |
| Surfactant | 0.4 | 0.4 | 0.4 |
| PROPERTIES: |  |  |  |
| Basis weight (g/m²) | 55.0 | 52.1 | 54.0 |
| Thickness (mils) | 6.9 | 8.2 | 6.9 |
| Porosity (l/min-100 cm²) | 340 | 106 | 131 |
| Max. pore size (microns) | 101 | 65 | 78 |
| Tensile Strength (g/25 mm) MD | 11400 | 11925 | 10750 |
| CD | 5000 | 8050 | 7100 |
| Avg. | 8200 | 9988 | 8925 |
| Mullen Burst (psi) | 56.9 | 74.3 | 63.0 |
| Stiffness (mg) | 40 | 190 | 128 |
| KOH wicking time (sec./in.) | 35 | 28 | 38 |
| KOH shrinkage (%) MD | 0.5 | 0 | 0.5 |
| CD | 0.5 | 0.5 | 0 |
| KOH thickness increase (%) | 10.5 | 0 | 0 |

TABLE II

|  | A | B | C | D | E | F | G | H |
| --- | --- | --- | --- | --- | --- | --- | --- | --- |
| COMPOSITION (%): |  |  |  |  |  |  |  |  |
| 1.1 × 3 mm PVOH | — | — | — | — | — | — | 56 | — |
| 0.5 × 3 mm PVOH | 56 | 56 | 56 | 56 | 42 | 42 | — | — |
| 1.1 × 3 mm PVOH binder | 16 | 16 | 16 | 16 | 16 | 16 | 16 | — |
| 1.0 × 3/16" rayon | 28 | — | — | — | — | 7 | — | — |
| 1.5 × 5 mm hollow rayon | — | 28 | 20 | 28 | 42 | 35 | 28 | 100 |
| 505 cotton | — | — | 8 | — | — | — | — | — |

TABLE II-continued

|  | A | B | C | D | E | F | G | H |
|---|---|---|---|---|---|---|---|---|
| Surfactant | 0.4 | 0.4 | 0.4 | 1.0 | 0.8 | 0.8 | 0.4 | 0 |
| PROPERTIES: |  |  |  |  |  |  |  |  |
| Thickness (mils) | 10.6 | 7.0 | 8.2 | 7.5 | 5.8 | 6.8 | 7.3 | 4.8 |
| Porosity (L/min-100 cm$^2$) | 307 | 79 | 132 | 88 | 44 | 76 | 112 | 20 |
| Max. pore size (microns) | 86 | 67 | 71 | 62 | 53 | 66 | 82 | — |
| KOH Wicking time (sec/inch) | 57 | 60 | 62 | 57 | 100 | 82 | 60 | — |
| Ave. Tensile (g/25 mm) | 8925 | 10150 | 8000 | 8375 | 9800 | 7475 | 6450 | 3820 |
| Mullen burst (psi) | 72 | 81 | 84 | 73 | 80 | 65 | 85 | — |
| Stiffness (mg) | 341 | 193 | 168 | 153 | 115 | 110 | 143 | — |
| Ave. KOH Shrinkage (%) | 0.4 | 0.4 | 0.05 | — | 0.4 | — | — | — |

As can be seen, the thickness of the sheet material using hollow (SBH) fibers was significantly reduced relative to the composition (A) using solid fibers of the same material despite the larger denier of the hollow fibers.

EXAMPLE 3

Additional hand sheets having a basis weight of 55 g/m$^2$ were prepared using a variation in the poly(vinyl alcohol)/rayon fiber mix. For hand sheets made with hollow rayon fibers substituted for the regular rayon there is not only a significant reduction in thickness and pore size achieved as a result of this substitution, but also enhanced strength characteristics. The furnishes and the properties of the resultant hand sheets is set forth in Table III. None of the hand sheets were provided with a secondary processing.

TABLE III

|  | A | B | C |
|---|---|---|---|
| COMPOSITION (%): |  |  |  |
| 1.1 dpf. × 3 mm PVOH |  |  |  |
| 0.5 dpf. × 3 mm PVOH | 62 | 62 | 56 |
| 1.1 dpf. × 3 mm PVOH binder |  |  | 16 |
| 1.1 dpf. × 4 mm PVOH binder | 7 | 7 |  |
| 1.5 dpf. × 5 mm rayon |  |  |  |
| 1.0 dpf. × 3/16" rayon | 31 |  | 14 |
| 1.5 dpf. × 5 mm hollow rayon |  | 31 | 14 |
| PROPERTIES |  |  |  |
| Thickness (mils) | 11.1 | 8.1 | 8.4 |
| Porosity (L/min-100 cm$^2$) | 281 | 88 | 140 |
| Max. pore size (micron) | 75 | 60 | 73 |
| Ave. Tensile (g/25 mm) | 3166 | 6433 | 9475 |
| Ave. KOH Shrinkage (%) | 0.2 | 0 | 0 |

EXAMPLE 4

Nonwoven sheet material was made in accordance with the process of Example 1 except that the fiber furnish was altered to eliminate all poly(vinyl alcohol) fibers and use primarily cellulosic fibers. The sheet material, after formation, was bonded using a poly(vinyl alcohol) bonding solution, Airvol 107, at a level of about 7%. The specifics of the fiber furnish and the properties of the resultant web material are set forth in Table IV.

TABLE IV

|  | A | B |
|---|---|---|
| COMPOSITION (%): |  |  |
| Vinyon 3.0 dpf. × ¼" | 18 | 18 |
| Flock | 6 | 6 |
| Hemp | 5 | 4 |
| Rayon 1.5 dpf. | 71 | 58 |
| Rayon 1.5 dpf. hollow | — | 14 |
| Bonding Treatment: | 7.4 | 7.4 |
| PROPERTIES: |  |  |
| Basis weight (g/m$^2$) | 55.4 | 50.6 |
| Thickness (mils) | 11.2 | 9.4 |
| CD Tensile (g/25 mm) | 3000 | 3000 |

TABLE IV-continued

|  | A | B |
|---|---|---|
| Mullen Burst (psi) | 20 | 19 |
| Porosity (L/min-100 cm$^2$) | 770 | 510 |
| AVE. KOH Shrinkage (%) | 5.6 | 5.5 |
| KOH Wicking Time (sec/in.) | 26 | 33 |
| AVE. Pore Size (microns) | 75 | 39 |

EXAMPLE 5

In order to show the effect of a combination of hollow fibers and low denier rayon fibers, nonwoven material having a composition similar to the material of Example 4 was formed on a paper making machine and the average shrinkage when exposed to 35% potassium hydroxide was noted. The specific furnishes and other properties are set forth in Table V. It is noted that the combination of hollow and low denier fibers provides a synergistic reduction, greater than 50%, in the average percent shrinkage when exposed to the alkaline environment.

TABLE V

|  | Control | A | B | C |
|---|---|---|---|---|
| COMPOSITION (%): |  |  |  |  |
| Vinyon 3.0 dpf. × ¼" | 18 | 18 | 18 | 18 |
| Flock | 6 | 6 | 6 | 6 |
| Hemp | 5 | 5 | 5 | 5 |
| Rayon 1.5 dpf. × ¼" | 8 | 8 | 8 | 8 |
| Rayon 1.5 dpf. × 5 mm | 63 | 47 | — | — |
| Rayon 1.5 dpf. × 5 mm hollow | — | 16 | — | 16 |
| Rayon 1.0 dpf. × 3/16" | — | — | 63 | 47 |
| PROPERTIES: |  |  |  |  |
| Basis Weight (g/m$^2$) | 58 | 57 | 57 | 58 |
| Thickness (mils) | 11.1 | 9.9 | 10.4 | 9.0 |
| Porosity (L/min-100 cm$^2$) | 565 | 275 | 423 | 144 |
| Tensile strength (g/25 mm) MD | 5460 | 5850 | 5875 | 6175 |
| CD | 3140 | 3140 | 3365 | 3400 |
| AVE. | 4300 | 4495 | 4620 | 4788 |
| KOH Wicking Time (sec/in) | 30 | 31 | 30 | 48 |
| Ave. KOH Shrinkage in 35% KOH(%) | 4.6 | 3.4 | 4.0 | 2.1 |

As will be apparent to persons skilled in the art, various modifications and adaptations of the products described above will become readily apparent without departing from the spirit and scope of the invention.

We claim:

1. In a battery separator for an electric storage cell comprising a nonwoven web consisting essentially of water dispersible fibers bonded with a minor amount of a synthetic binder, the improvement wherein the water-dispersible fibers include at least 5 percent by weight of synthetic fibers having a cross-sectional aspect ratio of greater than 2 uniformly distributed throughout the nonwoven web.

2. The separator of claim 1 wherein a major portion of the water dispersible fibers is cellulosic.

3. The separator of claim 1 wherein a major portion of the water dispersible fibers is synthetic.

4. The separator of claim 1 wherein the high cross-sectional aspect fibers constitute up to 100% of the water dispersible fibers.

5. The separator of claim 1 wherein the water dispersible fibers are a mixture of cellulosic and synthetic fibers, said high cross-sectional aspect fibers comprising 5–60% by weight of the total fiber content of the nonwoven web.

6. The separator of claim 5 wherein the web has a thickness increase of substantially less than 10 percent in a alkaline environment.

7. The separator of claim 1 wherein said high aspect fibers are selected from the group consisting of ribbon fibers and collapsed hollow fibers.

8. The separator of claim 1 wherein the high aspect fibers are collapsed hollow fibers and comprise 10% to 45% of the fiber content of the web.

9. The separator of claim 1 wherein the high aspect fibers have a width to thickness ratio in a range extending from 2 to 20.

10. The separator of claim 1 wherein the high aspect fibers are cellulosic fibers having a width to thickness ratio greater than 2 and less than 10.

11. The separator of claim 1 wherein the high aspect fibers have a denier in the range of 0.5 to 15 dpf. and a length within the range of 2 to 30 mm.

12. The separator of claim 1 wherein the binder constitutes less than 30% by weight of the nonwoven web and is comprised of binder fibers.

13. The separator of claim 1 wherein the binder is a soluble thermoplastic material.

14. The separator of claim 1 wherein the binder constitutes 3 to 20% by weight of the web.

15. The separator of claim 1 wherein the web has a thickness of less than 10 mils and an average pore size of less than 100 microns.

16. In a battery separator for an electric storage cell comprising a nonwoven web consisting essentially of water dispersable fibers bonded with a minor amount of a synthetic binder, the improvement wherein the water dispersable fibers include regular fibers and at least five percent by weight of high cross-sectional aspect ratio fibers of the same composition uniformly distributed throughout the nonwoven web, the high aspect ratio fibers being collapsed hollow fibers and the regular fibers being of a lower denier than the high aspect ratio fibers.

* * * * *